July 5, 1949. T. E. FRISCO 2,475,386
TOOLHOLDER
Filed May 4, 1945 2 Sheets-Sheet 1

INVENTOR.
THEODORE E. FRISCO
BY Richey & Watts
ATTORNEYS

Patented July 5, 1949

2,475,386

UNITED STATES PATENT OFFICE 2,475,386

TOOLHOLDER

Theodore E. Frisco, Cleveland, Ohio

Application May 4, 1945, Serial No. 592,047

5 Claims. (Cl. 279—16)

The present invention relates to a floating tool holder.

The principal object of this invention is to support a tool for floating or hunting movement, including both angular deviation and lateral offset of the tool axis with respect to the support axis in any direction, as well as axial relief when required, and to secure the tool firmly in position for operation without interfering with either the angular deviation or the lateral offset which it may have selected. Another object is to support a tool for angular and lateral movement and to prevent chattering when the tool is in use.

A further object is to provide a positive-driven tool holder of simplified construction, which is durable, highly reliable and easily manipulated.

Other and further objects, features and advantages will appear from the following detailed description of preferred embodiments considered in conjunction with the accompanying drawing in which Fig. 1 is a longitudinal sectional view of one embodiment of my invention;

Like reference characters are utilized throughout the drawing to designate like parts.

This application discloses improvements in the apparatus disclosed in my copending application Serial No. 546,037, filed July 21, 1944 for a Tool holder.

Figure 1:
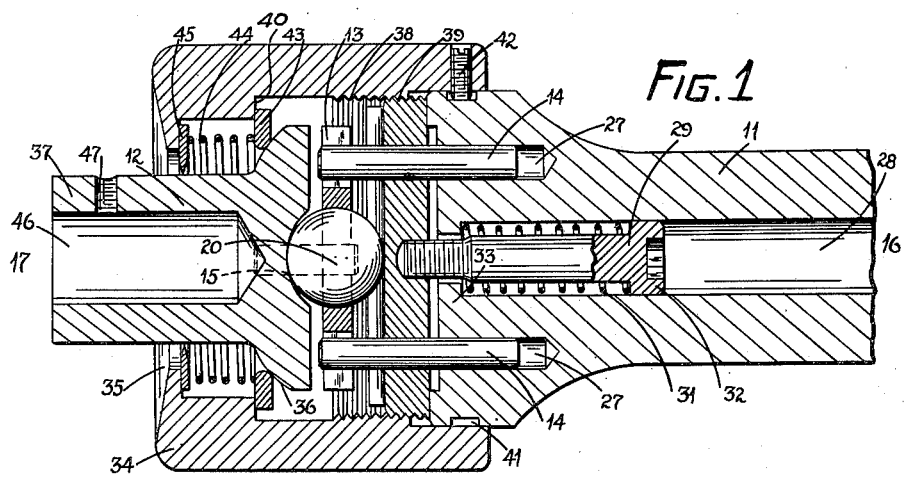
Figure 2:
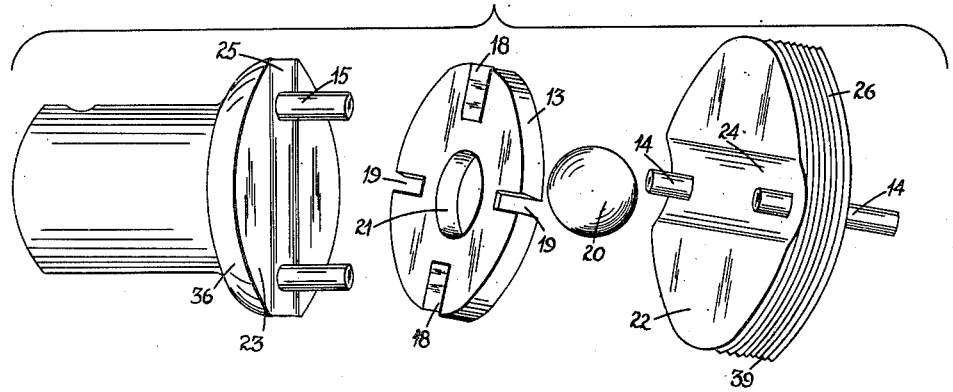
Fig. 2 is an exploded view of a part of the apparatus of Fig. 1.

In a preferred embodiment of my invention as illustrated in Figs. 1 and 2, I provide a shank 11, a holder 12 and a driving plate 13 interposed between the shank 11 and the holder 12. Means not shown are provided for mounting the shank 11 in such relation to work (not shown) that a tool (not shown) secured in the holder 12 may perform the desired operation on the work. Either the work or the shank 11 may be rotatably mounted, the other being held stationary. Suitable means are provided such as a pair of pins 14 mounted in the shank 11 and a pair of pins 15 mounted in the holder 12 for producing a driving relationship through the drive plate 13 between the shank 11 and the holder 12 with respect to rotation about either an axis 16 of the shank 11 or an axis 17 of the holder 12 depending upon whether the shank 11 or the work be rotated.

Figure 5:
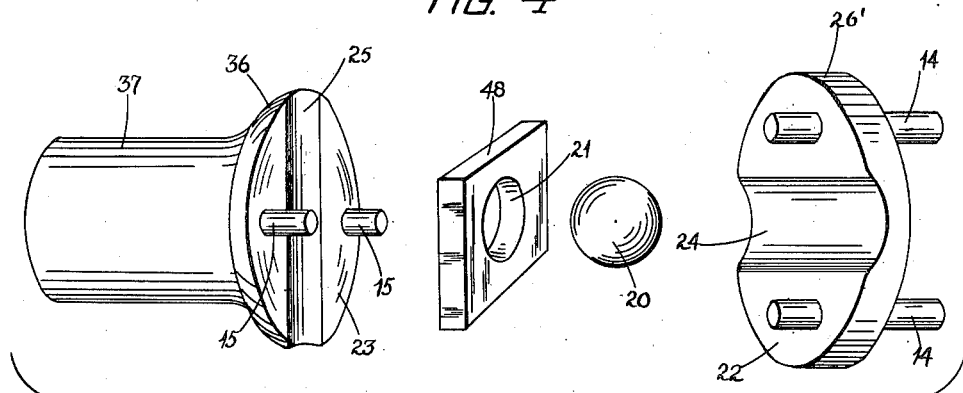
Fig. 5 is an exploded view of the arrangement of Fig. 4.

The arrangement is such that the holder 12 may float either laterally or angularly with respect to the shank 11. The holder axis 17 may either move radially with respect to the shank axis 16 or make an angle therewith without interfering with the rotary drive relationship. In the specific arrangement illustrated in Figs. 1 and 2 the floating driving relationship is accomplished by means of radial slots 18 in the drive plate 13 engaging the pins 14 and radial slots 19 in the drive plate 13 engaging the pins 15. For retaining the driving plate 13 in the floating position between the shank 11 and the holder 12 the drive plate 13 is provided with an aperture 21 and a ball 20 is loosely fitted in the aperture 21, the shank 11 and the holder 12 being provided with meeting or opposite surfaces 22 and 23 having transverse grooves 24 and 25, respectively, therein for retaining the ball 22. The arrangement is such that the grooves 24 and 25 are transverse to each other, for example, perpendicular to each other with each groove being along the line between the pair of engaging pins 14 or 15 but my invention is not limited thereto as obviously the pins may be mounted in a line across the grooves as shown in Fig. 5 where a suitable type of drive plate is employed.

In the specific arrangement illustrated in Figs. 1 and 2 the surface 22 is not formed directly in the shank 11 but in a piece 26 which is movable axially relative to the shank 11 to serve as a relief plate.

The pins 15 are fixed in the holder 12 protruding from the surface 23 thereof. However, to provide for axial movement of the relief plate 26, pin receiving sockets 27 are formed in the shank 11 in which the pins 14 have a sliding fit and the pins 14 extend on either side of the relief plate 26. The slots 18 and 19 in the drive plate 13 have sufficient width and radial length to provide a loose fit for the engaging pins 15 and 14 and also to permit lateral displacement of the holder axis 17 with respect to shank axis 16.

Suitable means are provided for yieldingly holding the relief plate 26 against the end of the shank 11. For example, as illustrated the shank 11 may be provided with an axial opening 28 and a machine screw 29 may be threaded into the center of the back surface of the relief plate 26 with a compression spring 31 between the screw head 32 and a shoulder 33 at the end of the central opening 28 of the shank 11.

For securing the holder 12 to the shank 11 a barrel 34 is provided having a shoulder 35 fitted around the holder 12. A convex preferably spherical surface 36 is formed on the holder 12 the inner end of the holder 12 being of greater diameter than the neck portion 37. For securing the barrel 34, the inner surface thereof is threaded at 38 and the outer edge 39 of the yield plate 26 is threaded to receive the threads 38 of the barrel 34. The barrel is also formed with a shoulder 40 between the shoulder 35 and the threaded portion 38. Furthermore, an annular groove 41 may be formed around the shank 11 near the end thereof and a set screw 42 may be provided in the barrel 34 adapted to extend into the groove 41. Preferably the set screw 42 is smaller than the width of the groove 41, so that the barrel 34 may be screwed in or out a limited amount while the screw is in the groove 41.

In order to maintain the parts assembled, a holding ring 43 is provided which is adapted to fit slidably against the convex surface 36 and a compression spring 44 is provided for pressing the ring 43 against the surface 36. The ring 43 is small enough to permit radial and angular movement of the holder 12 within the barrel 34, and large enough to be engaged by the shoulder 40 in any adjusted position when the barrel 34 is screwed down tightly. Preferably a retaining ring 45 is mounted between the spring 44 and the shoulder 35 of the barrel 34.

The holder 12 is provided with a socket 46 for receiving the shank of the suitable tool such as reamer for example and the holder 12 may have a threaded opening 47 for receiving a set screw to secure a tool in the socket 46.

When the tool in the holder 12 is utilized in an installation in which the work remains stationary and the shank 11 and the holder 12 are required to rotate the barrel 34 is preferably turned to such a position that the spring 44 is compressed just sufficiently to hold the ring 43 lightly against the convex surface 36 in order to prevent the ball 20 from rolling out of either of the grooves 24 or 25, which have a radius of curvature equal or greater than that of the ball 20. Assuming that the tool such as a reamer is mounted in the socket 46 and that the work is so positioned that the axis 17 of the holder 12 is required to be out of alignment with the axis 16 of the shank 11 whether or not the two axes are at an angle with each other it will be observed that the rolling of the ball 22 within either of the grooves 24 and 25 with shifting of the drive plate 13 permits transverse or radial adjustment as the parts 11 and 12 rotate about their respective axes without interfering with the rotary driving relationship. The drive plate 13 may also move radially as a result of the depth of the slots 18 and 19. If the axes 16 and 17 are oblique to each other the pins 14 and 15 may move into or out of the slots 18 and 19 sufficiently to allow for the angular distortion.

The operation is the same if the shank 11 is held in a stationary position and the work is made to rotate. However, in this case after the tool such as a reamer has worked in sufficiently to find the proper position, any further motion of the holder 12 will be unnecessary and to prevent chattering of the tool it may be desirable to cause the holder 12 to be secured in a fixed position. This may be done by screwing down the barrel 34, compressing the spring 44 until the shoulder 40 engages the ring 43 and presses the same positively against the convex surface 36 of the holder 12, to lock the parts in the selected position. In case a tool such as a reamer is being employed such that axial movement of the holder 12 is not desired, the set screw 42 may be moved into the annular slot 41 to hold the relief plate 26 from moving any substantial amount away from the end of the shank 11, while permitting the barrel to be turned a half turn or so to lock or release the holder 12 for adjustment with respect to the shank 11. It will be observed that there is an opening 47 within the shoulder 35 of the barrel 34 of sufficiently greater size than the outer diameter of the neck portion 37 of the holder 12 to permit considerable lateral and angular movement of the holder 12 with respect to the ball 34. The inner and outer diameters of the retaining ring 45 are such that the spring 44 is held within the shoulder 35 regardless of the position of the holder 12.

Figure 3:
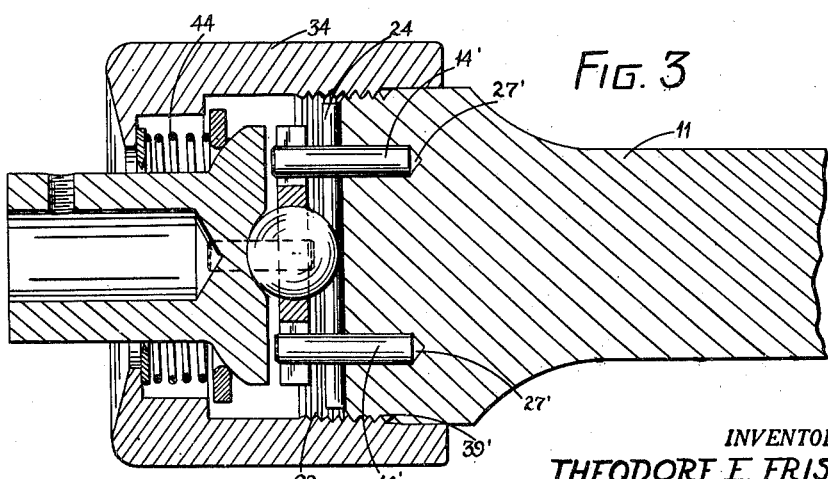
Fig. 3 is a longitudinal sectional view of an embodiment of my invention in which a shank is grooved to receive a thrust ball.

Under certain circumstances it might be desirable to permit axial yielding of the tool even when the barrel 34 is tightened against the spring 44 to hold the tool normally in a definite adjusted position. For example, in the use of a tap there may be discrepancies between the rate of feed of the work and the lead of the tap thread, causing the tap or the work to move abruptly in an axial direction and tending to break the tap in the work and thereby spoil the work. When such operations are to be performed the set screw 42 is backed out of the annular slot 41 so as to permit yielding of the barrel 34 and the holder 12 against the force of the compression spring 41. The spring 41 is so designed that it yields more readily than the spring 44 so that the surface 36 is not loosened.

Where the operation to be performed is such that axial yielding independently of the spring 44 is not required, the surface 22 and the ball receiving groove 24 may be formed directly in the end of the shank 11 as illustrated in Fig. 3. In this case the relief plate 26 is not employed and the barrel 34 is threaded directly to an outer threaded surface 39' formed on the shank 11. Furthermore, pins 14' are fitted into openings at 27' in the shank 11 of such size as to form a drive fit holding the pins 27' in the fixed axial position in the shank 11.

Figure 4:
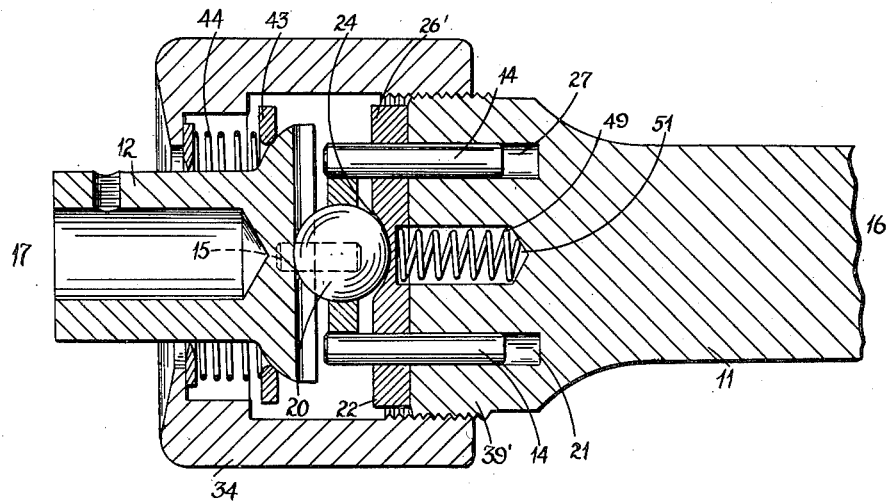
Fig. 4 is a longitudinal sectional view of an embodiment of my invention in which a square drive plate is employed.

In the arrangement of Figs. 1, 2 and 3 I have shown a radially slotted drive plate 13. It is to be understood, however, that my invention is not limited to the precise arrangement described and illustrated and includes the use of any suitable drive plate adapted to form a rotary driving connection while allowing for floating laterally or angularly. For example, as illustrated in Figs. 4 and 5 a square drive plate 48 may be employed or it may be an oblong drive plate having such length and width as to fit singly between the pair of engaging pins 14 and between the engaging pins 15. The pins 14 and 15 may be round as illustrated, or may be formed with flat sides to engage the plate, such as square or rectangular pins.

In the arrangement of Figs. 4 and 5 the barrel 34 is threaded directly to the threaded surface 39' of the shank 11 and there is a yield plate 26' made small enough to fit loosely within the barrel 34. The engaging pins 14 are secured in the yield plate 26', as in the case of the yield plate 26 shown in Fig. 1.

In order to allow the holder 12 to be pulled out axially against the force of the spring 44 when required as in the case of tapping operations without permitting the ball 20 to lose contact with the grooves 24 and 25, a thrust spring 49 is provided in a socket 51 in the shank 11 which resiliently presses the yield plate 26' toward the ball 20.

In the arrangement of Figs. 4 and 5 the driving relationship between the shank 11 and the holder 12 with respect to rotation about the axis 17 or the axis 16 is obtained by reason of the fact that the parallel sides of the drive plate 48 slidably fit between the pins 14 and the pins 15. The holder 12 is free to move laterally, however, or angularly inasmuch as the plate 48 is free to slide transversely between the pins as in arrangements of Figs. 1 to 3.

When the shank 11 is to be held in a stationary position, and the work is to be rotated a slight turn of the barrel 34 is sufficient to loosen the holder 12 to enable the tool to find the correct angle of position and displacement for the work and a slight turn is then sufficient to tighten the holding ring 43 against the convex surface 36 for holding the tool in the adjusted position and preventing chattering.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a tool holder, a shank, a holder, each including means rotatable therewith having a face with a groove therein, one groove being transverse to the other, a ball fitting in both grooves, a drive plate having an aperture therein surrounding said ball, and means on each of said faces engaging said drive plate with respect to angular motion around an axis normal to the drive plate but slidable with respect to radial motion, said holder having a convex substantially spherical surface behind its face, a clamping ring fitting against said convex surface and means for resiliently holding said ring against said surface for binding the holder and shank in adjustable fixed relation to each other.

2. In a tool holder, a shank, a holder having a face with a groove therein, a relief plate having a face with a groove therein, one groove being transverse to the other, a ball fitting in both of said grooves, a drive plate having an aperture therein, surrounding said ball and means in said holder and relief plate engaging said drive plate with respect to angular motion around an axis transverse to the drive plate but slidable with respect to radial motion, means for securing said relief plate to said shank with respect to rotary motion leaving the relief plate fully movable with respect to axial motion, resilient means for urging said relief plate axially toward said shank, and means for resiliently holding said holder against said relief plate.

3. In a tool, a shank, a holder each including means rotatable therewith having a face with a groove therein, one groove being transverse to the other, a ball fitting in both grooves, a drive plate having an aperture therein surrounding said ball and having two opposed pairs of straight parallel sides and means projecting from each of said faces slidably fitting against a pair of parallel sides of said drive plate permitting angular and sliding motion of said drive plate around either of said means.

4. In a tool holder, a shank, a driving plate and a relief plate fitting against the end of said shank and having pins extending therethrough, resilient means urging said relief plate toward the drive plate, said shank having holes therein for loosely receiving said pins to produce a driving relationship with respect to rotary motion between said relief plate and said shank, and said drive plate being adapted to be engaged by said pins, to cause the parts to partake of angular motion around an axis intersecting the drive plate but said parts being relatively slidable with respect to radial motion.

5. In a tool holder, a shank, a holder having a face with a groove therein, a relief plate having a face with a groove therein, one groove being transverse to the other, a ball fitting in both of said grooves, a drive plate having an aperture therein surrounding said ball, and means in said holder and relief plate engaging said drive plate with respect to angular motion around an axis transverse to the drive plate but slidable with respect to radial motion, means for securing said relief plate to said shank with respect to rotary motion leaving the relief plate fully movable with respect to axial motion, resilient means for urging said relief plate axially toward said shank, and means for resiliently holding said holder against said relief plate.

THEODORE E. FRISCO.

REFERENCES CITED

The following references are of record in the file of this patent:

UNITED STATES PATENTS

| Number | Name | Date |
| --- | --- | --- |
| 553,265 | Scholer | Jan. 2, 1896 |
| 1,241,175 | Watts | Sept. 25, 1917 |
| 1,309,217 | Ratheram | July 8, 1919 |
| 1,566,553 | Maisch | Dec. 22, 1925 |
| 1,831,382 | Gairing | Nov. 10, 1931 |
| 1,907,447 | Schlitz | May 9, 1933 |
| 2,007,897 | Skeel | July 9, 1935 |